US007401538B2

(12) United States Patent
Cheng

(10) Patent No.: US 7,401,538 B2
(45) Date of Patent: Jul. 22, 2008

(54) F FIGURE WRENCH

(76) Inventor: Chin-Shun Cheng, No.37-2, Ching-Dau 1 st Street, Taichung (CN) 404

( * ) Notice: Subject to any disclaimer, the term of this patent is extended or adjusted under 35 U.S.C. 154(b) by 0 days.

(21) Appl. No.: 11/450,588

(22) Filed: Jun. 12, 2006

(65) Prior Publication Data

US 2007/0283790 A1 Dec. 13, 2007

(51) Int. Cl.
*B25B 23/16* (2006.01)
*B25G 1/02* (2006.01)
*B25G 1/00* (2006.01)
*F16B 7/10* (2006.01)
*F16D 1/12* (2006.01)

(52) U.S. Cl. .................... 81/177.9; 81/177.8; 81/177.6; 81/177.7; 81/177.85; 403/83

(58) Field of Classification Search ..... 81/177.6–177.9; 403/83–106, 322.4, 325
See application file for complete search history.

(56) References Cited

U.S. PATENT DOCUMENTS 1,198,822 A * 9/1916 Capel ........................ 81/177.9
5,199,335 A * 4/1993 Arnold et al. .............. 81/177.8
5,531,140 A * 7/1996 Chow ...................... 81/177.85
6,216,317 B1 * 4/2001 Chen ........................... 16/430
6,220,125 B1 * 4/2001 Lan ........................... 81/177.9
6,267,032 B1 * 7/2001 Hsieh ...................... 81/177.85
6,857,341 B1 * 2/2005 Cheng ........................ 81/177.8
2004/0083861 A1 * 5/2004 Hu ............................ 81/177.8
2005/0016332 A1 * 1/2005 Hu ............................ 81/177.8
2005/0103168 A1 * 5/2005 Wei ........................... 81/177.7
2005/0274234 A1 * 12/2005 Lee ........................... 81/177.8

* cited by examiner

*Primary Examiner*—Joseph J. Hail, III
*Assistant Examiner*—Bryan R Muller
(74) *Attorney, Agent, or Firm*—WPAT, P.C.; Anthony King

(57) ABSTRACT

This invention relates to an F figure wrench that comprises a holding rod, a moving part, a turning rod and a driving part. At one end of the holding rod, a concavity is made and two lugs are implemented; the concavity is made as a guide hole to accommodate the moving part, the lug holes of the two lugs are used as pivot holes for the driving part to be pivot-connected with the holding rod. Furthermore, a penetration is made on the holding rod and the moving part concentrically, and intersects through the concavity for installation of the turning rod. A cam eccentric to the turning rod axis is implemented on the turning rod; when the turning rod is turned, the moving part is pushed by the eccentric cam and moving along the guide hole in the holding rod. There is at least one clutch part on the end of the moving part and at least one match part on the driving part to match with the clutch part; with turning the turning rod, the match of the moving part with the driving part is under control, thereof the driving part is able to be adjusted or locked in position relatively to the handle of the wench.

12 Claims, 14 Drawing Sheets

A-A

F FIGURE WRENCH

FIELD OF THE INVENTION

This invention relates to a wrench with figure of F, specifically an F figure wrench that has its driving part able to be adjusted on angle or locked in position relatively to its holding rod.

BACKGROUND OF THE INVENTION

The generally recognized F figure wrench, as depicted in U.S. Pat. No. 6,220,125 FIG. 3, has an angle adjusting device functioning so a cam 8 implemented on a rod body 9 pushes an arresting member 10 to retain a driving head 11, thereby position of the driving head that has been adjusted can be locked in; to release the locked-in driving head position, the rod body will need to be turned and then the arresting member will no longer retain the driving head, then the angle of the driving head will be free to be adjusted; to lock the driving head in position again, the rod body will need to be turned to have the cam push the arresting member to retain the driving head in desired position. Nevertheless, the angle adjusting device of the generally recognized F figure wrench is in an unstable situation when its arresting member 10 is not in contact with its rod body, which will create fault function and damage to the parts of the wrench, therefore improvement on the angle adjusting device is presumed required.

SUMMARY OF THE INVENTION

The intention of this invention is to provide an easy-to-operate F figure wrench that comprises a holding rod, a moving part, a turning rod and a driving part. At one end of the holding rod, a concavity is made and two lugs are implemented; the concavity is made as a guide hole to accommodate the moving part, the lug holes of the two lugs are used as pivot holes for the driving part to be pivot-connected with the holding rod. Furthermore, penetrations are made on the holding rod and the moving part concentrically, and intersect with the concavity for installation of the turning rod. A cam eccentric to the turning rod axis is implemented on the turning rod, when the turning rod is turned, the moving part is pushed by the eccentric cam and moving along the guide hole in the holding rod. There are at least one clutch part on the end of the moving part and at least one match part on the driving part to match with the clutch part; with turning the turning rod, the match of the moving part with the driving part is under control, and then the driving part is able to be adjusted or locked in position relatively to the handle of the wench.

DETAILED DESCRIPTION OF THE PREFERRED EMBODIMENT

Figure 1:
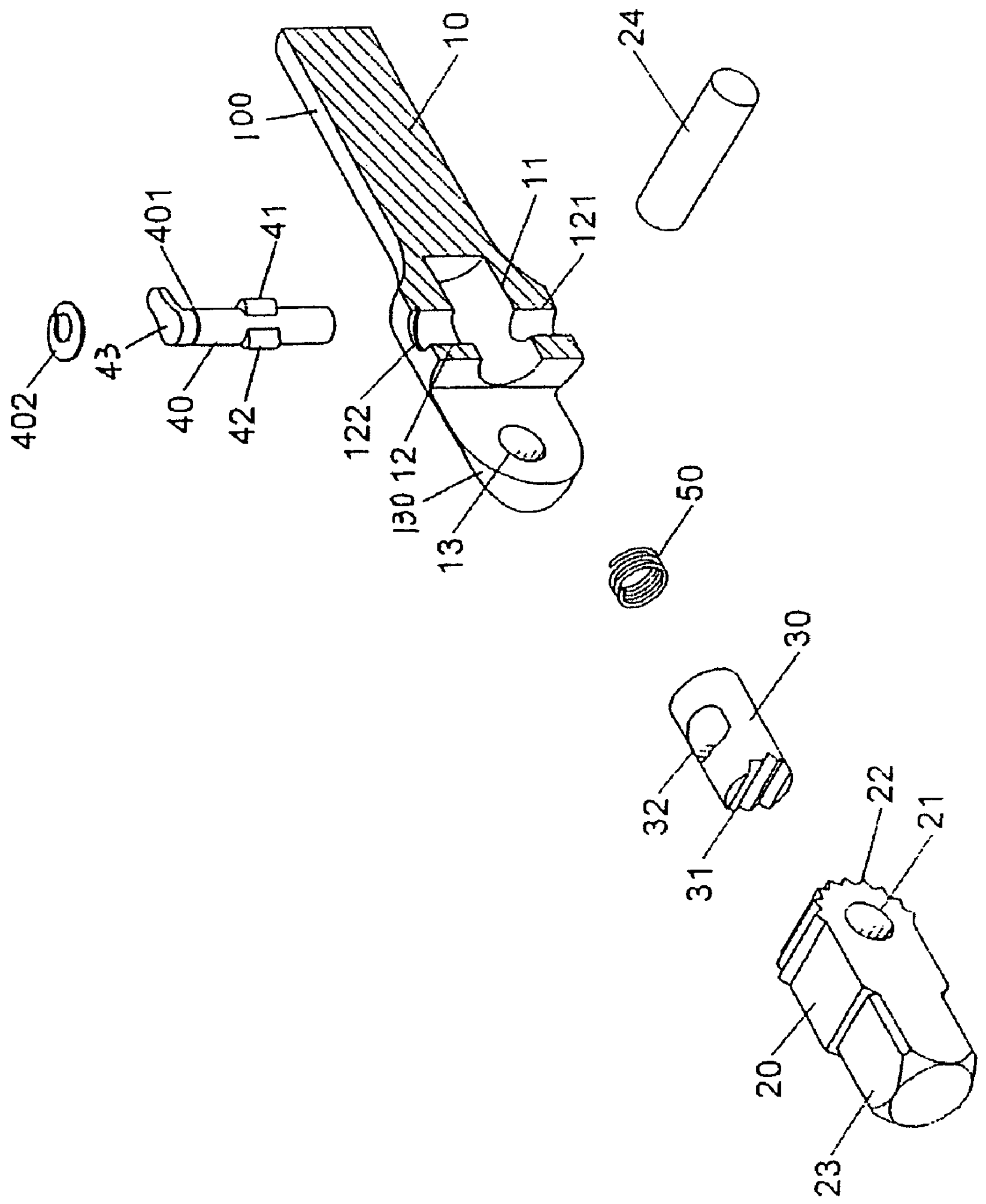
FIG. 1 is an exploded perspective of the embodiment of the present invention.

As shown on FIG. 1, the F figure wrench of this invention comprises a holding rod 10, a moving part 30, a turning rod 40 and a driving part 20.

The holding rod 10 has a primary end and a secondary end, and a longitudinal axis extending from the primary end along the holding rod to the secondary end. The primary end of the holding rod 10 is concaved as a guide hole 11 extending along the longitudinal axis, and said end has two lugs 130 extending outwardly from the both sides of the guide hole 11, the lug holes 13 of the two lugs 130 are used as pivot holes for installation of pivot 24. The primary end of the holding rod 10 has a penetration 12 intersecting the guide hole 11.

The moving part 30 has a primary end, a secondary end and a puncture 32; the primary end will be installed inside the guide hole 11, the puncture 32 is concentric with the penetration 12 on the holding rod 10, and at least one clutch part 31 is implemented on the secondary end of the moving part 30.

The turning rod 40 has a primary end and a secondary end, the secondary end will be installed inside the penetration 12, the primary end will be presented outside with a knob 43, at least one side on the periphery of the turning rod 40 implements two eccentric cams 41/42.

The driving part 20 has a primary end, a secondary end and a second pivot hole 21 concentric with the lug holes 13 of the two lugs 130. The pivot 24 is installed in the pivot hole 21 to be pivot connected with the holding rod 10. The primary end of the driving part 20 has at least one match part 22 that matches with the clutch part 31 of the moving part 30.

In the embodiment as shown on FIG. 1, the secondary end of the driving part 20 implements a driving head 23 to drive a work piece. The secondary end of the holding rod 10 extends an appropriate length handle 100.

In the embodiment as shown on FIG. 1, the guide hole 11 intersects vertically with the penetration 12, and the axis of the guide hole 11 does not intersect with the axis of the penetration 12.

In the embodiment as shown on FIG. 1, a ring groove 122 with larger radius is implemented inside the penetration 12 close to outside of the penetration, wherein a lock ring 402 is embedded therein to retain the turning rod 40, wherein another ring groove is implemented on the periphery of the turning rod 40 to accommodate the inside of the lock ring 402, thereof said turning rod will be securely retained in the penetration.

In the embodiment as shown on FIG. 1, the shape of the driving head 23 on the driving part 20 is a quadrangle for being adopted with a sleeve, thereof a work piece can be fitted.

In the embodiment as shown on FIG. 1, the driving part 20 is equipped with plurality of match parts 22 in a form of gear teeth around the axis of the pivot hole 21; the moving part 30 is equipped with a plurality of clutch parts 31 in a form of gear teeth matched with the match parts 22, thereof the driving part 20 is able to be bent to multiple angles or locked in position relatively to the holding rod 10.

Figure 2:
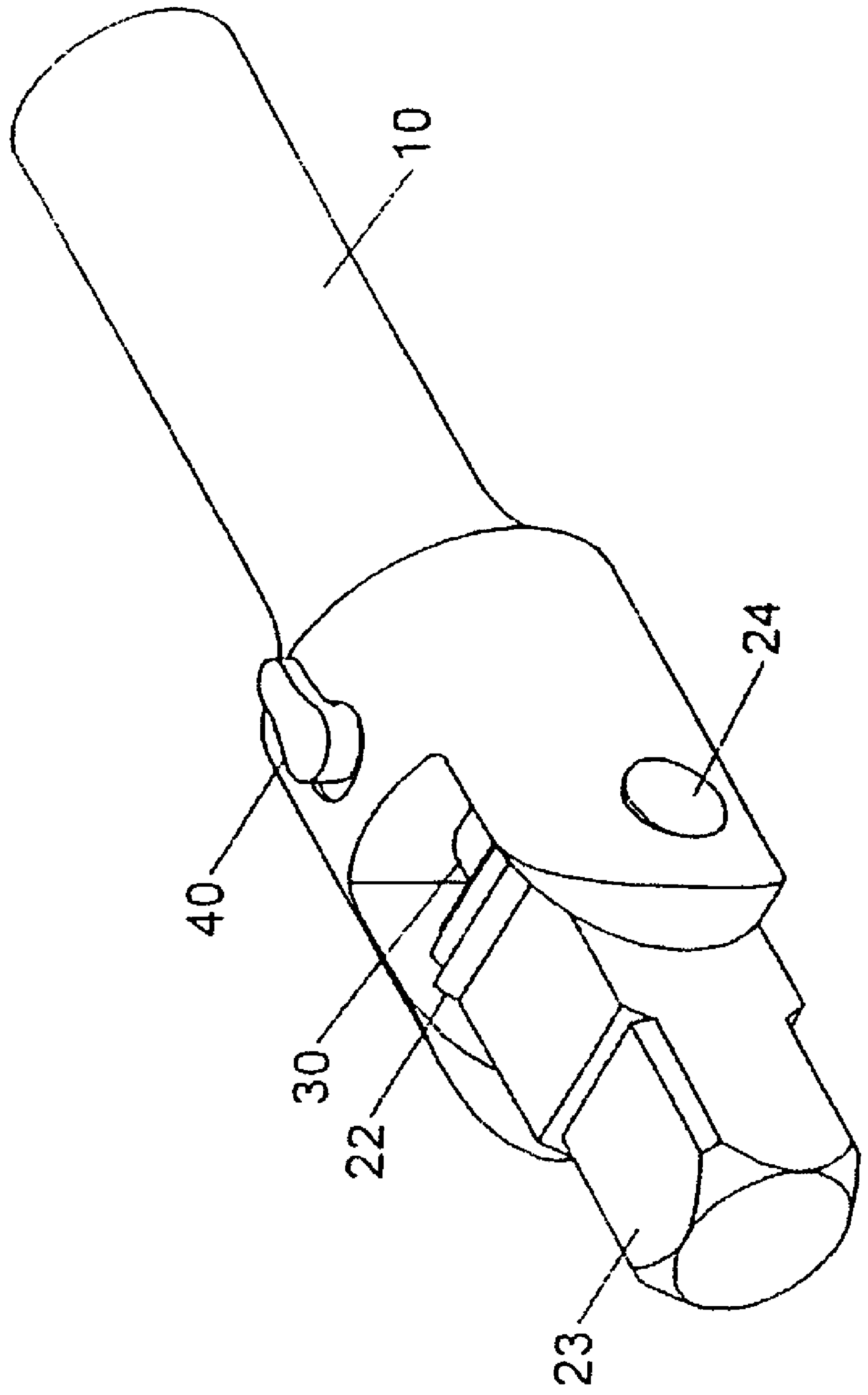
FIG. 2 is an assembly appearance of FIG. 1.
Figure 3:
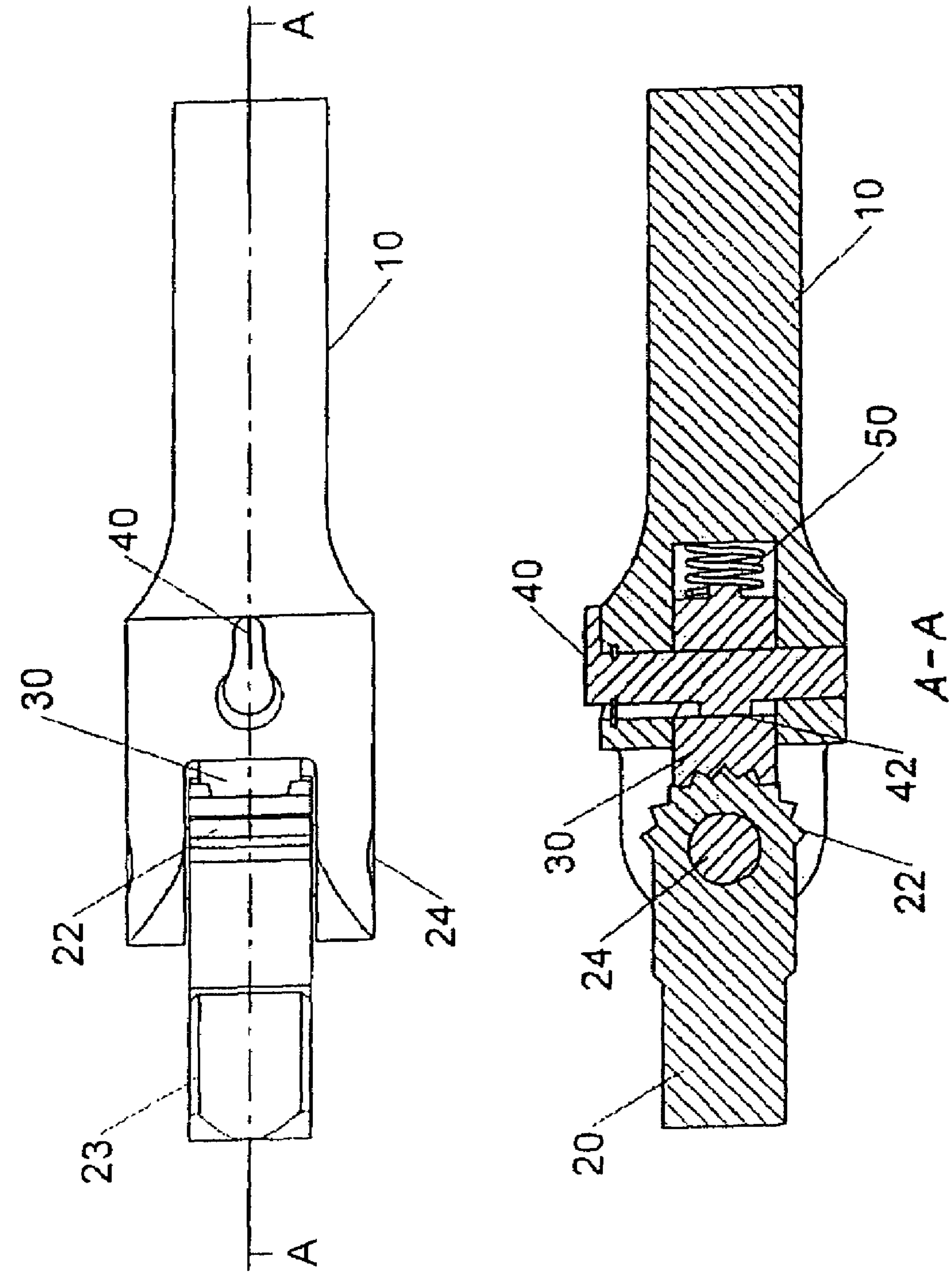
FIG. 3 is a cross-section view of FIG. 2.

In the embodiment as shown on FIGS. 1 to 3, the guide hole 11 intersects vertically with the penetration 12, in which the turning rod 40 is installed penetrating through the puncture 32 of the moving part 30 and as well the guide hole 11.

Figure 5:
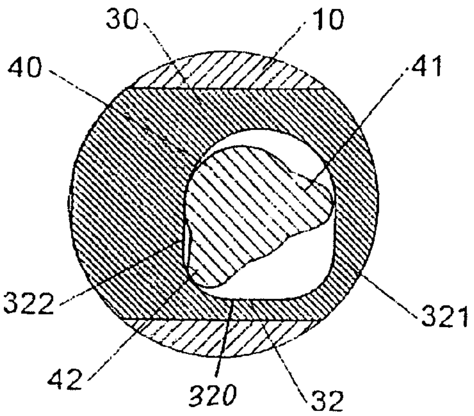
FIG. 5 shows the turning rod rotated to another position referring to FIG. 4.
Figure 4:
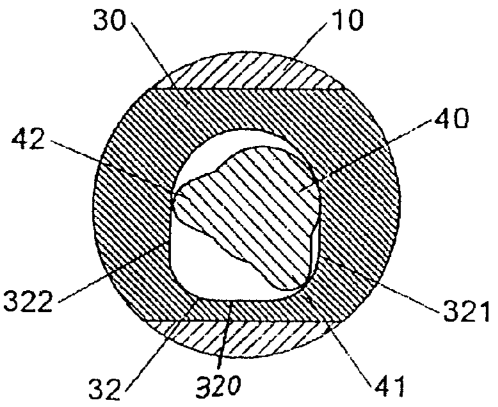
FIG. 4 is a cross-section view showing the combination status about the turning rod and the moving part of the present invention.

In the embodiment as shown on FIGS. 1, 4 and 5, the inner wall of the puncture 32 in the moving part 30 has the push fronts 321/322 at the locations close to the primary end and the secondary end of the moving part 30 to take the push force from the eccentric cams 41/42 on the turning rod 40; furthermore, a friction surface 320 is formed in-between the push fronts 321/322 on the inner wall of the puncture 32 for the purpose of locking the eccentric cams 41/42 in position with friction.

Figure 7:
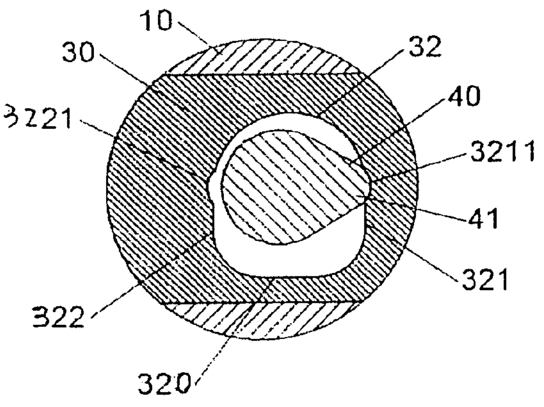
FIG. 7 shows the turning rod rotated to another position referring to FIG. 6.
Figure 6:
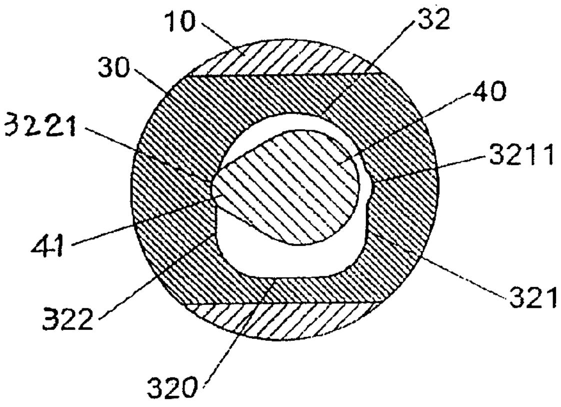
FIG. 6 is a cross-section view showing another embodiment of the moving part of the present invention.

In the embodiment as shown on FIGS. 6 and 7, concavities 3211/3221 are each implemented on the push fronts 321/322 for the purpose of locking the eccentric cam 41 in position to avoid arbitrary rotating of the in-positioned turning rod 40.

In the embodiment as shown on FIG. 1, two said eccentric cams 41/42 each implementing on the two sides of the turning rod 40 are located on the arc of the rotating axis of the turning rod 40.

In the embodiment as shown on FIG. 1, the primary side of the moving part 30 connects a primary side of a resilient object 50, and a secondary side of said resilient object contacts with the bottom of the guide hole 11.

Figure 8:
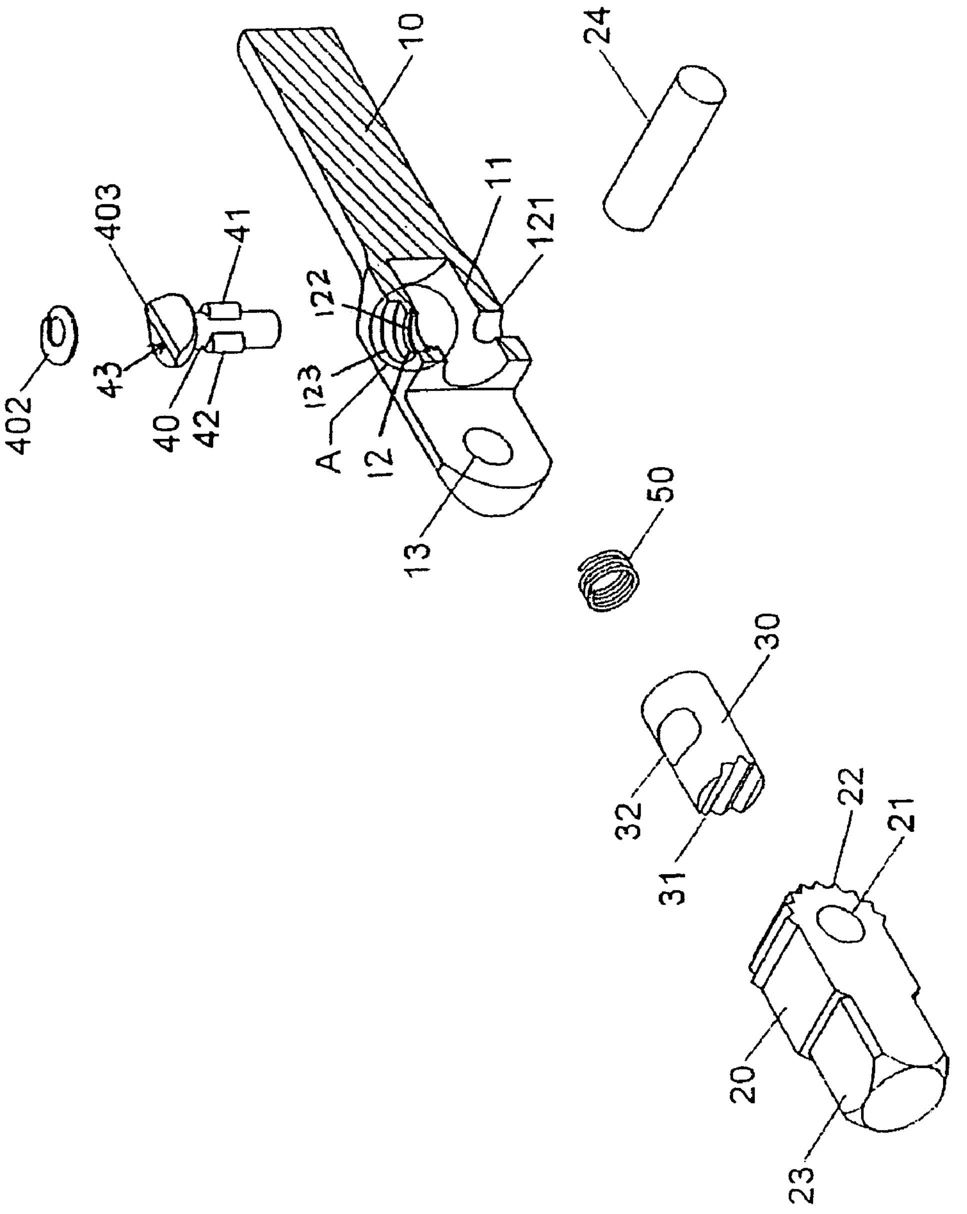
FIG. 8 shows another embodiment of the turning rod of the present invention.

In the embodiment as shown on FIG. 8, the knob 43 is larger than the turning rod 40; with recessed penetration 12 on the holding rod 10, the turning rod 40 and the knob 43 are to be accommodated into.

Figure 9:
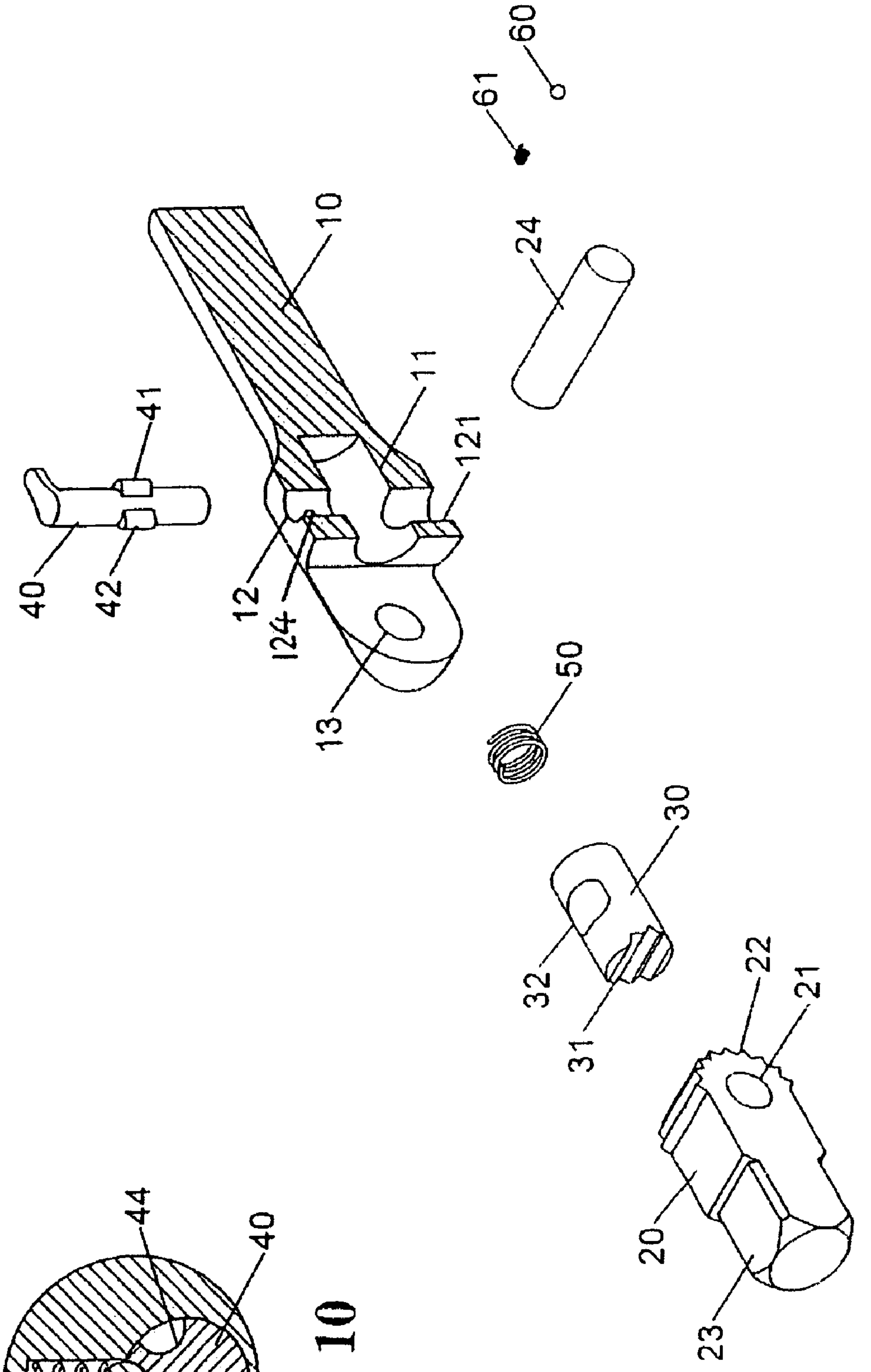
FIG. 9 shows another embodiment of the penetration and the turning rod of the present invention.
Figure 10:
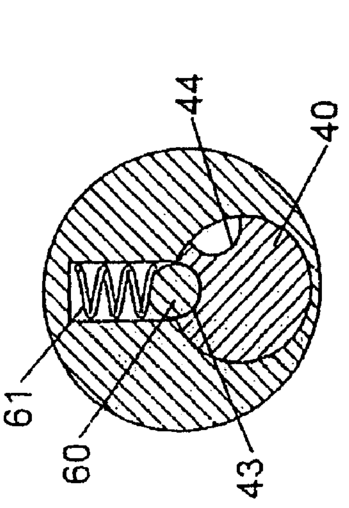
FIG. 10 is a partial assembly view of FIG. 9.

In the embodiment as shown on FIGS. 9 and 10, a cavity 124 is implemented on the wall inside of the penetration 12 of the holding rod 10, in which a resilient object 61 and a bead 60 are installed in order. Two click grooves 43/44 implementing on the periphery of the turning rod 40 relatively in position to the bead 60 are located on the arc of the rotating axis of the turning rod 40.

Figure 11:
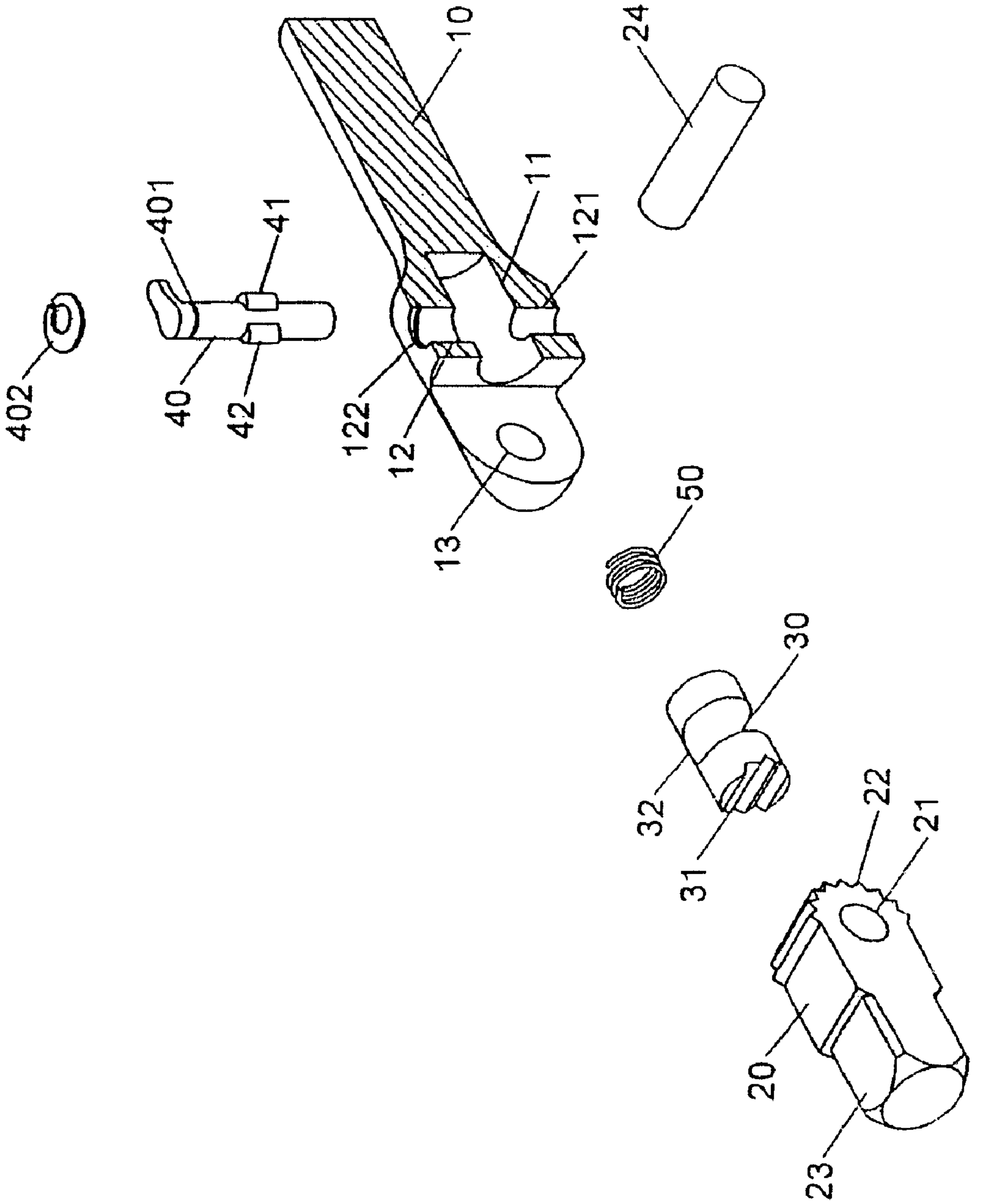
FIG. 11 shows another embodiment of the moving part of the present invention.

In the embodiment as shown on FIG. 11, the puncture 32 of the moving part 30 is open on one side that shaped as a U when looking at one end of the puncture 32.

Figure 12:
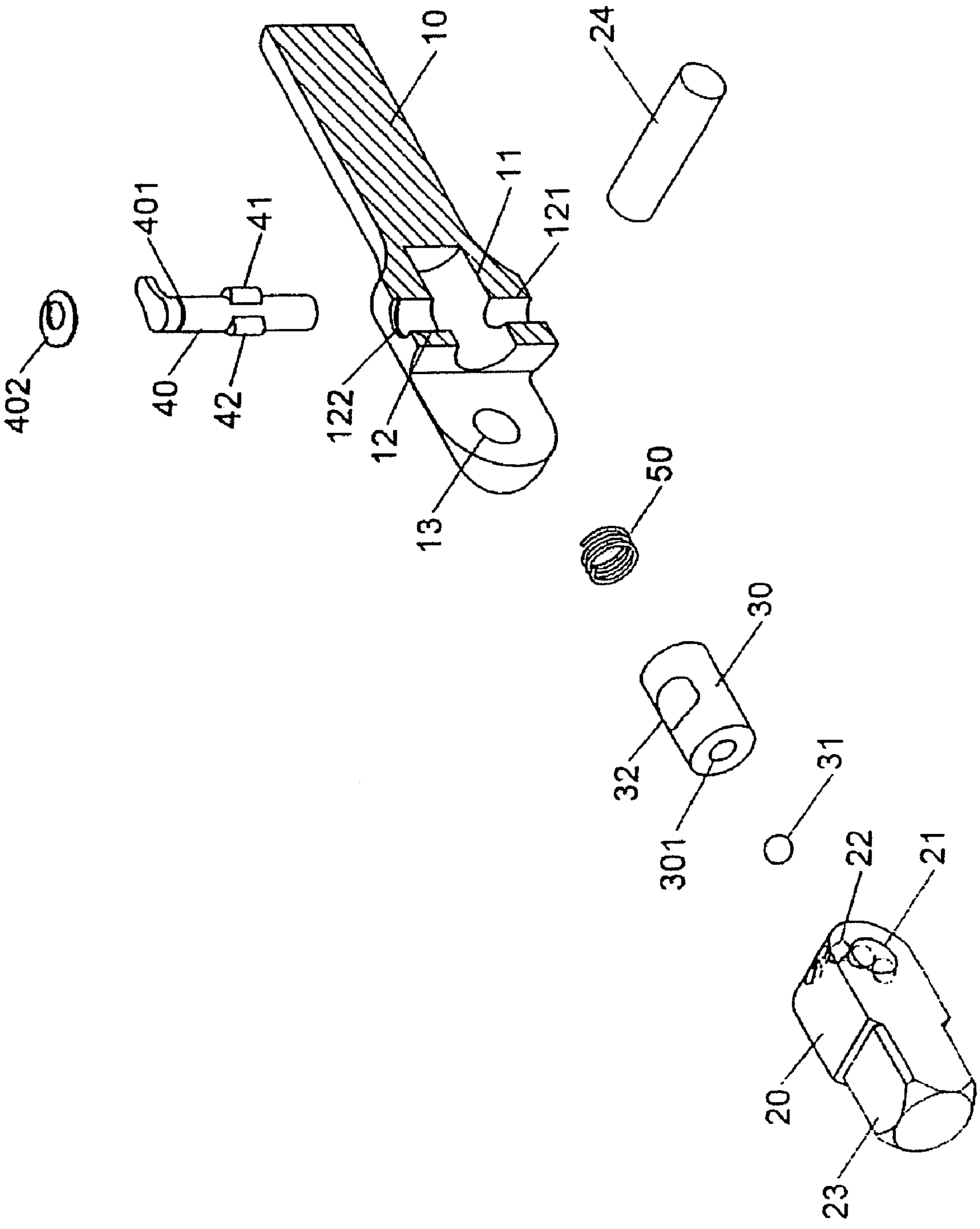
FIG. 12 shows another embodiment of the moving part and the driving part of the present invention.

In the embodiment as shown on FIG. 12, a cavity 301 is implemented on the secondary end of the moving part 30, in which a bead is installed to form a match part 31, a clutch part 22 of the driving part 20 is a concavity for said bead to be accommodated. Furthermore, the driving part 20 has plurality of clutch parts 22, each said clutch part is a concavity for accommodating the bead. The plurality of clutch parts 22 is set up around the axis of the pivot hole 21, with which the bead to be accommodated, then the driving part 20 is able to be bent to multiple angles or locked in position relatively to the holding rod 10.

Figure 13:
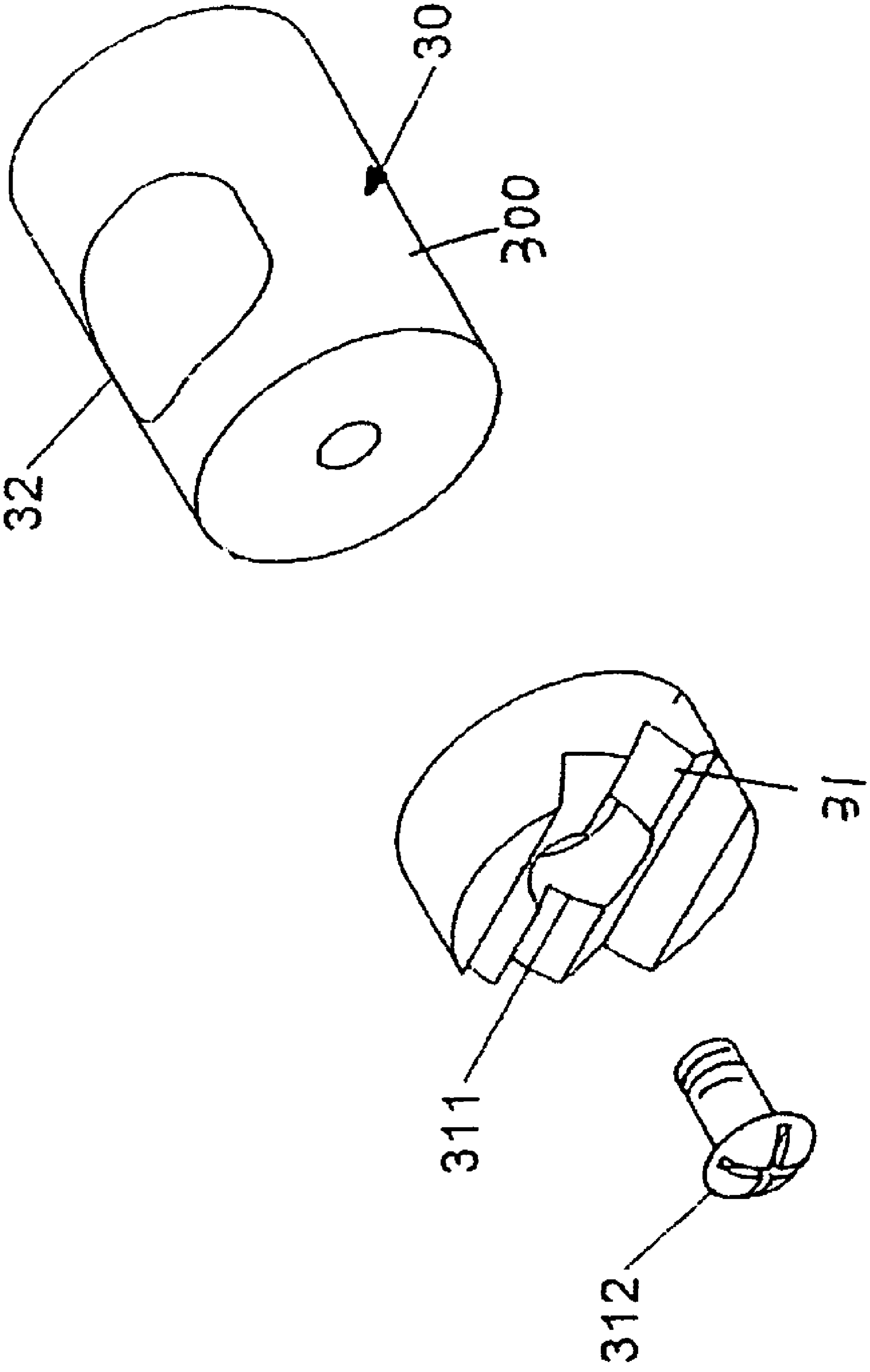
FIG. 13 shows another embodiment of the moving part of the present invention.

In the embodiment as shown on FIG. 13, the moving part 30 comprises a primary unit 300 and a secondary unit 311 that are tied together with a bolt 312. The said puncture 32 is implemented on the primary unit 300, while the said match part 31 is implemented on the secondary unit 311.

Figure 14:
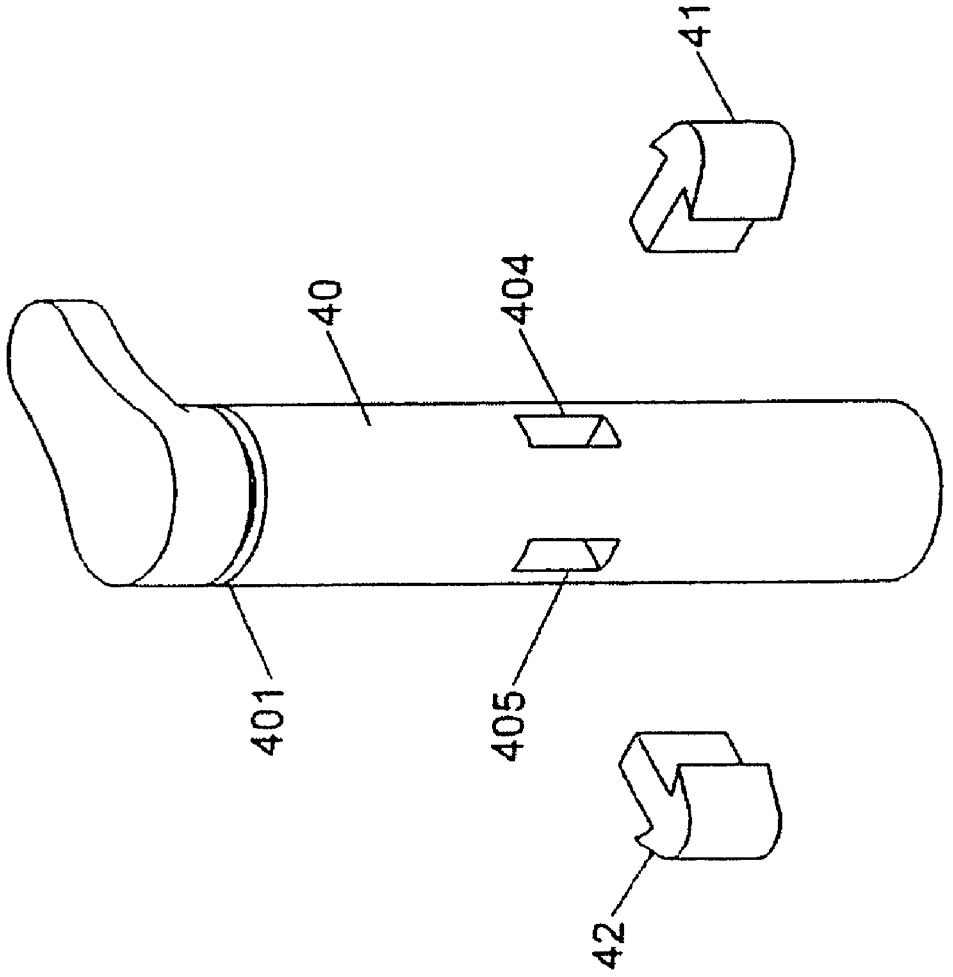
FIG. 14 shows another embodiment of the turning rod of the present invention.

In the embodiment as shown on FIG. 14, insert holes 404/405 are implemented on the periphery of the turning rod 40, in which insert blocks are fitted to form the eccentric cams 41/42.

Figure 15:
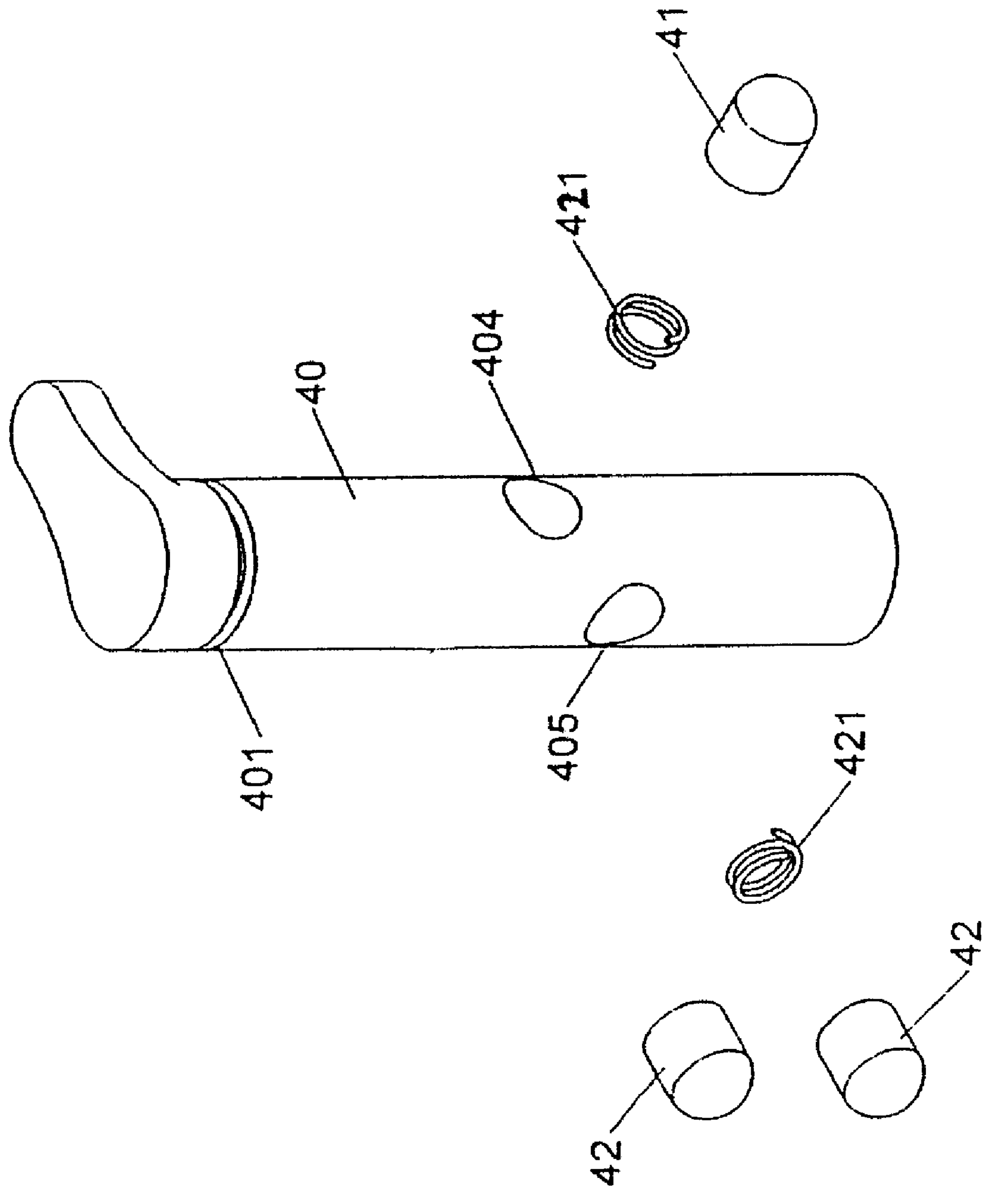
FIG. 15 shows another embodiment of the turning rod of the present invention.

In the embodiment as shown on FIG. 15, insert holes 404/405 are implemented on the turning rod 40, in which resilient objects 421 and insert blocks are fitted to form the eccentric cams 41/42 which are positioned on the periphery of the turning rod.

Figure 16:
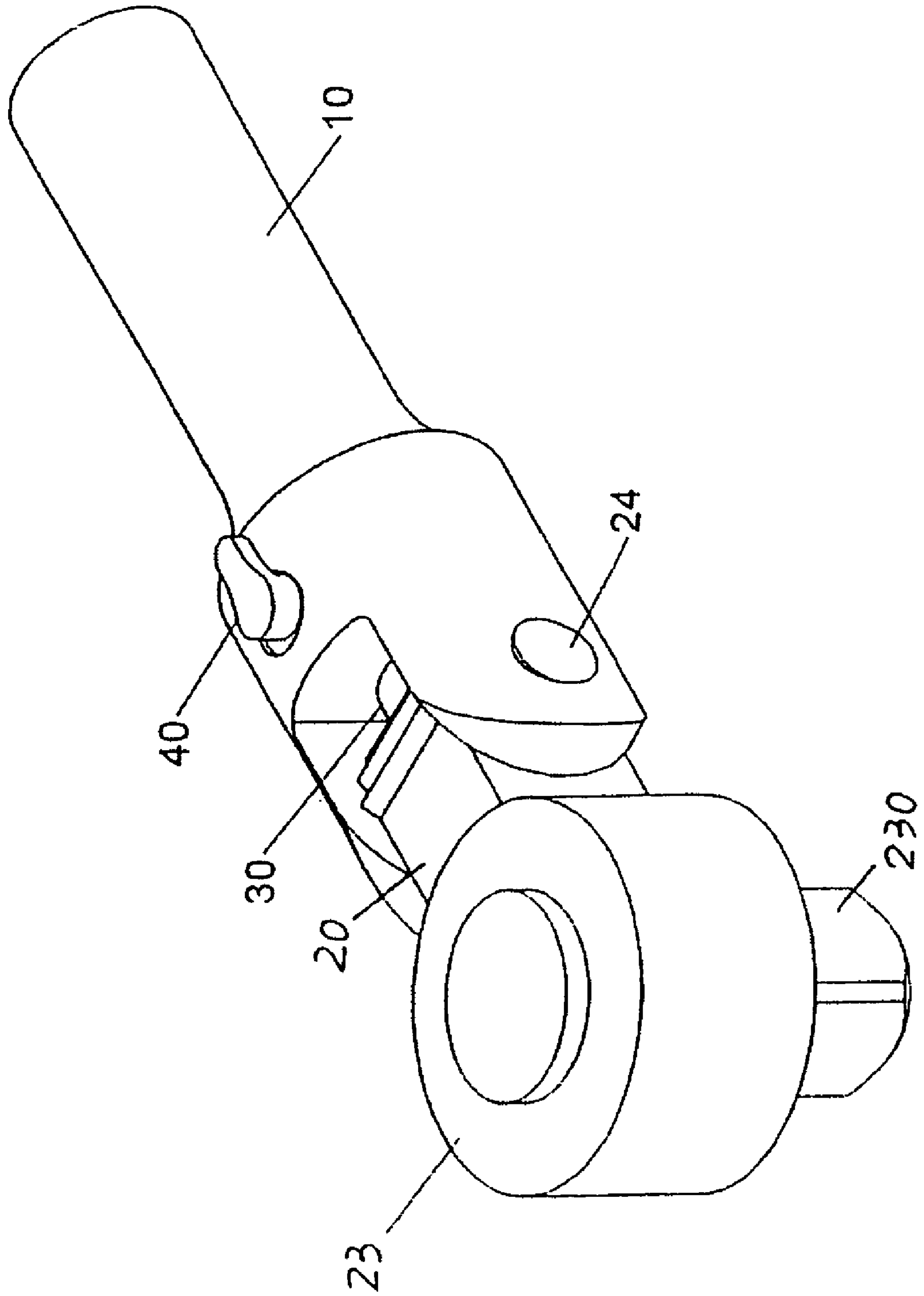
FIG. 16 shows another embodiment of the driving part of the present invention.
Figure 17:
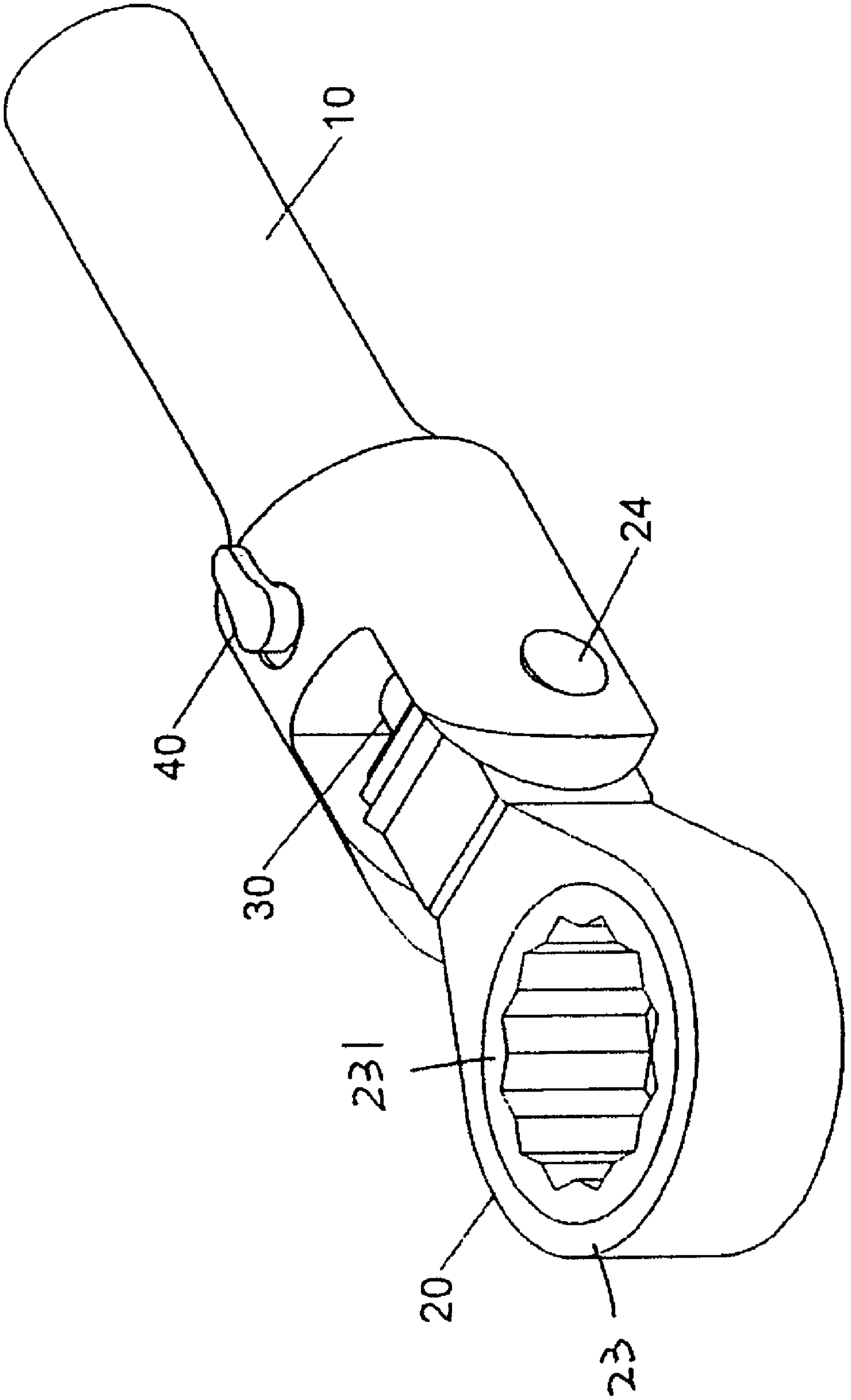
FIG. 17 shows another embodiment of the driving part of the present invention.

In one embodiment of the invention, the driving head 23 of the driving part 20 can be a ratchet driving head. In the embodiment as shown on FIG. 16, the ratchet driving head includes a rotator 230 that a sleeve would be fitted onto. In the embodiment as shown on FIG. 17, the ratchet driving head includes a sleeve 231 that a work piece would be fitted into.

Figure 18:
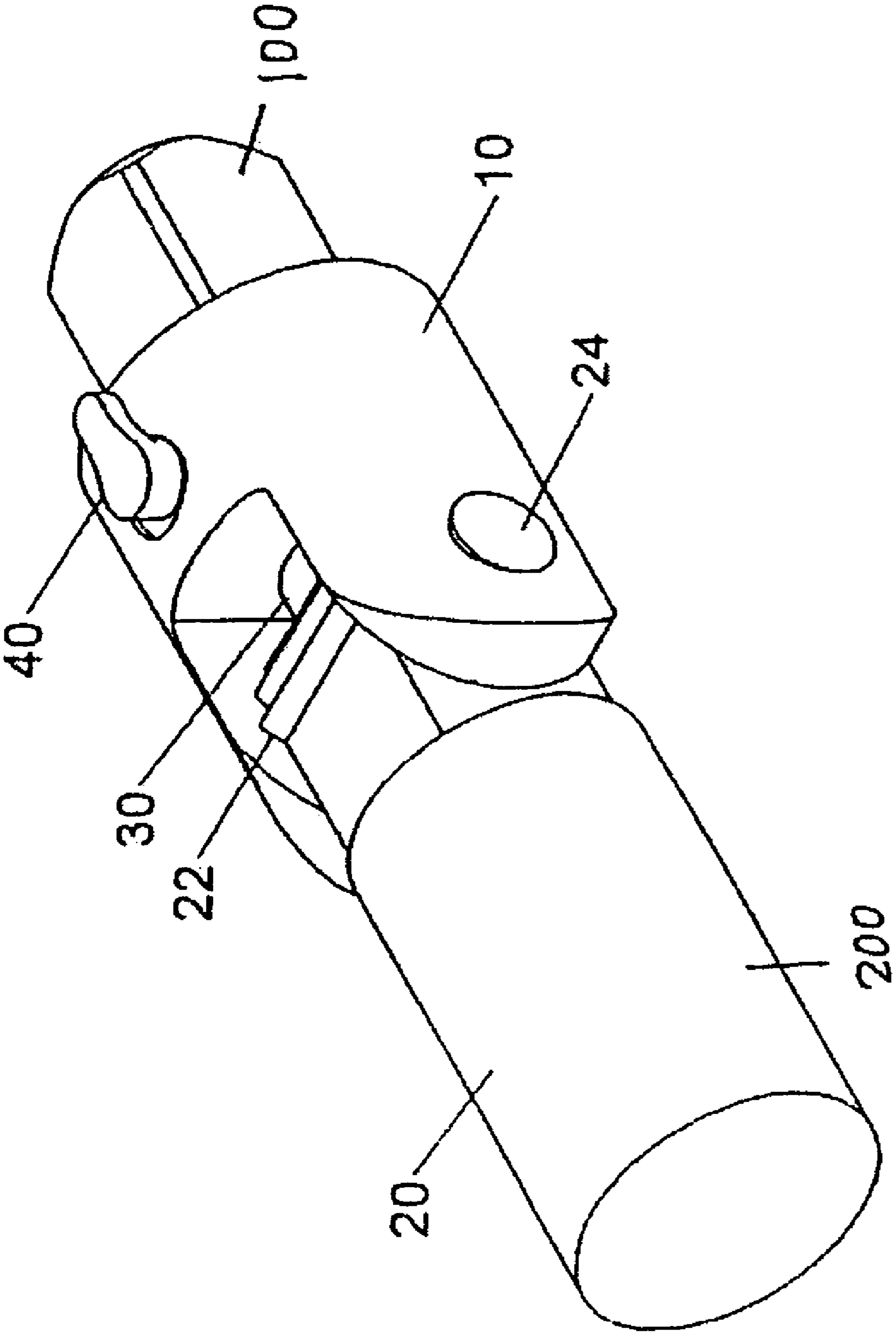
FIG. 18 shows another embodiment of the holding rod and the driving part of the present invention.

In the embodiment as shown on FIG. 18, the secondary end of the holding rod 10 is a quadrangle that a sleeve would be fitted onto, the secondary end of the driving part 20 extends a handle 200 in certain length.

While we have shown and described in accordance with the present invention, it should be clear to those skilled in the art that further embodiments may be made without departing from the scope of the present invention.

What is claimed is:

1. An F figure wrench comprising:

a holding rod having a primary end and a secondary end, and a longitudinal axis extending from the primary end to the secondary end, the primary end of the holding rod having a guide hole extending along the longitudinal axis, said primary end having two lugs extending outwardly from the both sides of the guide hole, each said lug having a lug hole for receiving a pivot, said primary end of the holding rod having a penetration intersecting with the guide hole, wherein the penetration has a ring groove close to outside of the penetration, the radius of the ring groove being bigger than the radius of the penetration, and an outer section of a lock ring is embedded in the ring groove;

a moving part having a primary end, a secondary end and a puncture, the primary end of the moving part being installed inside the guide hole, the puncture being concentric with the penetration on the holding rod, the secondary end having a plurality of clutch parts, the plurality of clutch parts being in the form of gear teeth, the primary end of the moving part connects a primary side of a resilient object, a secondary side of said resilient object contacts with the bottom of the guide hole;

a cylindrical turning rod having a primary end and a secondary end, said secondary end being installed inside the penetration, the primary end being presented outside with a knob, the turning rod having two positions on the periphery and each position having one eccentric cam, and the two eccentric cams being located on an outer circumferential surface of the turning rod, wherein each said eccentric cams is an insert block being offset from one another and having no connection to a spring, wherein another ring groove is implemented on the periphery of the turning rod to accommodate the inside of the lock ring, whereby said turning rod will be securely retained in the penetration, wherein in a locking position said outer circumferential surface of the turning rod is in abutting contact with an inner surface of said puncture, and each of said two eccentric cams located on said periphery of said turning rod are also in abutting contact with said inner surface of said puncture, and wherein in a unlocking position said outer circumferential surface of said turning rod is in abutting contact with an inner surface of said puncture, and each said two eccentric cams located on said periphery of said turning rod are also in abutting contact with said inner surface of said puncture;

a driving part having a primary end, a secondary end and a second pivot hole being concentric with the lug holes of the lugs, whereby the pivot being installed in the pivot hole and pivotally connected with the holding rod, said primary end having a plurality of match parts to match with the clutch parts of the moving part, the plurality of match parts being in a form of gear teeth around the axis of the pivot hole, the gear teeth of the driving part being matched with the gear teeth of the match parts;

wherein the inner wall of the puncture in the moving part has two push fronts each respectively being at the locations close to the primary end and the secondary end of the moving part to take the push force from the eccentric cams of the turning rod, and each push front having a concavity implemented therein for the purpose of locking the eccentric cam in position.

2. The wrench of claim 1 wherein the secondary end of the driving part has a driving head for driving a work piece.

3. The wrench of claim 1 wherein the secondary end of the holding rod has an extending handle in certain length.

4. The wrench of claim 1 wherein the guide hole is intersected vertically with the penetration.

5. The wrench of claim 1 wherein the shape of the driving head on the driving part is a quadrangle.

6. The wrench of claim 1 wherein the guide hole intersects vertically with the penetration, in which the turning rod is installed penetrating through the puncture of the moving part and as well the guide hole.

7. The wrench of claim 1 wherein the moving part comprises a primary unit and a secondary unit that are tied together with a bolt, the primary unit has said puncture and the secondary unit has the clutch part.

8. The wrench of claim 1 wherein each said position of the turning rod has an insert hole, in each insert hole an insert block is fitted to form the eccentric cam.

9. The wrench of claim 1 wherein the driving head of the driving part is a ratchet head.

10. The wrench of claim 1 wherein the ratchet driving head includes a rotator for receiving a sleeve.

11. The wrench of claim 1 wherein the ratchet driving head includes a sleeve for receiving a work piece.

12. The wrench of claim 1 wherein the secondary end of the holding rod is a quadrangle that a sleeve may be fitted onto, the primary end of the driving part extends a handle in certain length.

* * * * *